(No Model.)
C. L. TRAVIS.
LAWN SPRINKLER.
No. 573,933. Patented Dec. 29, 1896.
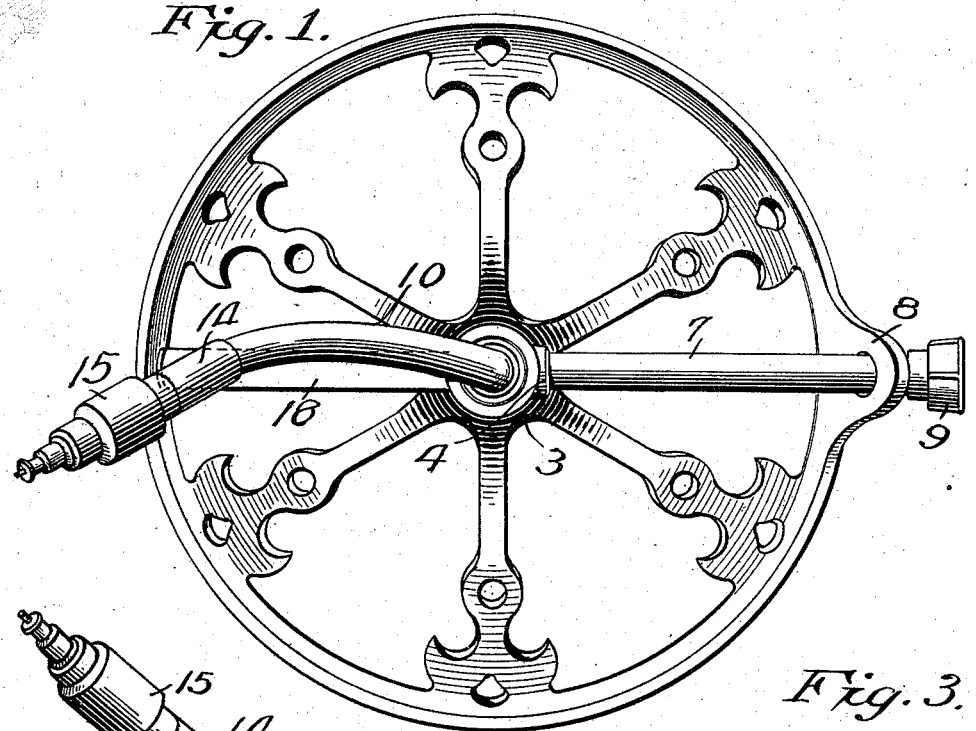
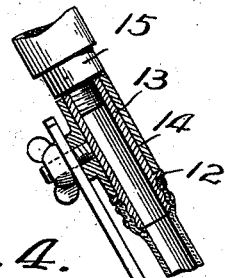
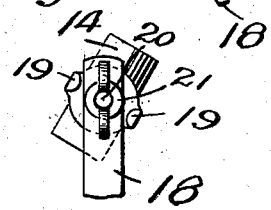
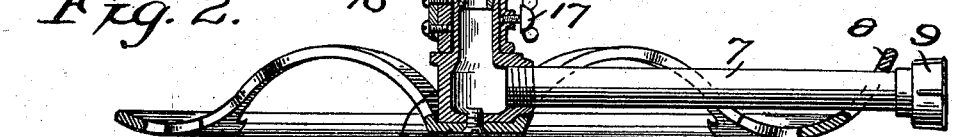
Witnesses:
O. E. Van Doren
W. E. Copley
Inventor:
Charles L. Travis.
By Paul O'Fawley
his Att'ys.

UNITED STATES PATENT OFFICE.

CHARLES L. TRAVIS, OF MINNEAPOLIS, MINNESOTA.

LAWN-SPRINKLER.

SPECIFICATION forming part of Letters Patent No. 573,933, dated December 29, 1896.

Application filed August 20, 1895. Serial No. 559,908. (No model.)

*To all whom it may concern:*

Be it known that I, CHARLES L. TRAVIS, of the city of Minneapolis, county of Hennepin, State of Minnesota, have invented certain new and useful Improvements in Lawn-Sprinklers, of which the following is a specification.

My invention relates to a rotary lawn-sprinkler; and the object of my invention is to provide a sprinkler without a water-journal which will water a large area and which propels itself from the force of the water from the nozzle, and, further, one which will present a neat appearance and is of a size proportionate to the work which it is adapted to accomplish, and, further, one which will be thoroughly durable and may be drawn from place to place about a lawn by means of the hose, it being unnecessary to approach the sprinkler in order to move the same.

My invention consists generally in a suitable base adapted to rest upon the ground and slide freely thereon, in combination with a short piece of hose or flexible tubing arranged thereon and provided with a hose connection and an inclined arm whereto the outer or upper end of said short section of tubing is attached and by which it is held in any desired position to secure a rotary effect of the hose and nozzle.

Further, my invention consists in particular constructions and combinations of parts, all as hereinafter described, and particularly pointed out in the claims.

The invention will be more readily understood by reference to the accompanying drawings, forming part of this specification, and in which—

Figure 1 is a plan view of a lawn-sprinkler embodying my invention. Fig. 2 is a vertical and partial sectional view thereof. Fig. 3 is a sectional view of the upper end of the flexible tube, showing the means for connecting the supporting and adjusting rod thereto. Fig. 4 is a detail view of the clamp for the rod.

As shown in the drawings, I provide a base preferably circular in form and adapted to lie upon the ground. This base has a convex lower surface to its ring-like outer part, and the arms connecting the same with the center 3 are preferably curved upwardly and the center 3 preferably raised slightly above the level of the bottom of the base. Upon the center 3 is secured an elbow 4, having a smooth hub 5, provided with an interior thread 6.

7 represents a short section of pipe screwed into the elbow 4 and leading through a loop 8, preferably provided in the base-casting and having on its outer end a coupling 9, to which the garden-hose may be attached. The short flexible tube or section of hose 10 is provided with a metallic coupling 11, having a threaded end to engage the thread of the hub 5 and make a water-tight joint therewith. On the upper end of the hose 10 is a similar metallic coupling 12; but this coupling is elongated to form a smooth-surfaced tube 13 to be embraced by the box which carries the rod-clamp. The nozzle 15 is secured in the upper end of the elongated coupling or tube 12.

On the hub 5, forming part of the elbow-coupling, I provide the sleeve 16, preferably having the thumb-screw 17, by which the sleeve may be fastened upon the hub 5, if desired. This sleeve is adapted to revolve freely on the hub 5, and to the sleeve I secure the supporting-rod 18, to the upper end of which I secure the box 14. The fastening for this box is of the form shown particularly in Figs. 2 and 4, lugs 19 being provided on the box to limit the angle at which the nozzle may be placed, and a thumb-nut screw 20 is provided to fasten the box on the rod when a proper adjustment has been made. By this means the nozzle 15 may be directed at any angle with respect to the axis of the device, and when so directed and a stream of water is projected through the same the nozzle with the tube will be quite rapidly rotated about the center of the base as an axis, the loose engagement of the box 14 with the tube or coupling 12 permitting the coupling to revolve within the box.

The best results are obtained of the carrying power of the water which is ejected from the point of the nozzle by revolving the device at a moderate rate of speed, and for this purpose I provide the adjusting-box 14, so that the angle of the nozzle may be adjusted relatively to the axis that it revolves upon to determine its speed under different pressures. The arms of the base are preferably curved upward, so as to keep them clear of the grass and secure the bearing for the base upon the ring forming its circumference.

Having thus described my invention, I claim as new and desire to secure by Letters Patent—

1. The combination, in a lawn-sprinkler, of a suitable base, with a short section of hose or flexible tubing projecting upward from said base, means for conveying water to said hose, the lower end of which is suitably secured upon the base, and revoluble means whereby the upper end of said hose is supported while being free to revolve about the axis of the lower end of the hose or tube, the upper end of the hose having a partial tangential adjustment whereby the stream emitted therefrom will cause said upper end to rotate, substantially as described.

2. The combination, in a lawn-sprinkler, of a suitable base, with a short section of hose or flexible tubing having its lower end secured upon said base, means for conducting water thereto, a nozzle provided upon the upper end of said hose or tube, and a freely-revoluble support for the upper end of said hose or tube and the nozzle, and whereby the nozzle is held angularly with respect to the axis of the lower end of the hose or tube, substantially as described.

3. The combination, in a lawn-sprinkler, of a suitable base, with a short section of hose or flexible tubing having its lower end secured upon said base, means for conducting water thereto, a nozzle provided upon the upper end of said hose or tube, a freely-revoluble support for the upper end of said hose or tube and the nozzle, and whereby the nozzle is held angularly with respect to the axis of the lower end of the hose or tube, and means in connection with said support whereby the angle of the nozzle may be determined, substantially as described.

4. The combination, in a lawn-sprinkler, of a suitable base, with a short section of hose or flexible tubing having its lower end secured upon said base, means for conducting water thereto, a nozzle provided upon the upper end of said hose or tube, a freely-revoluble support for the upper end of said hose or tube and the nozzle, and whereby the nozzle is held angularly with respect to the axis of the lower end of the hose or tube, and an adjusting device provided in connection with said support whereby the angle or position of the nozzle relative to the lower end of the tube may be changed, substantially as described.

5. The combination, in a lawn-sprinkler, of a suitable base, with a hose connection thereon, a short section of hose or flexible tubing extending upward therefrom and having a tight non-revoluble joint thereon, an elongated tube provided upon the upper end of said hose-section and whereto the nozzle may be attached, a box embracing said tube, and a support whereon said box is adjustable, substantially as described.

6. The combination, in a lawn-sprinkler, of a suitable base, with a hose connection thereon, a short section of hose or flexible tubing extending upward therefrom and having a tight non-revoluble joint thereon, an elongated tube provided upon the upper end of said hose-section and whereto the nozzle may be attached, a box embracing said tube, a support whereon said box is adjustable, and said support being freely revoluble to permit the revolution of the upper end of said hose-section with respect to the lower end and the base, substantially as described.

7. The combination, in a lawn-sprinkler, of a suitable base provided with a hose connection, a short section of hose or tubing extending upward therefrom and provided on its upper end with a suitable nozzle, a box engaging the upper end of said hose or tube, an inclined support revoluble upon the center of the base, upon the upper end of which said box and hence the upper end of the tube and the nozzle are adjustable, substantially as described.

8. The combination, in a lawn-sprinkler, of a suitable base provided with a hose connection, a hose or tube 10 secured thereon by a fixed joint, a nozzle carried upon the upper end of said hose or tube, a revoluble ring provided upon the base, a supporting arm or rod extending therefrom, and an adjustable connection between the upper end of said rod or arm and the upper end of said tube or hose or the nozzle, substantially as described.

9. In a lawn-sprinkler, the combination, with an annular base adapted to rest upon the ground, of an elbow or hose connection provided centrally upon said base, a pipe or tube 7 leading from the outer edge of the base to said elbow, and a flexible hose or tube extending upward from said elbow, substantially as described.

10. A base for a lawn-sprinkler, comprising the ring, the center portion, and the upwardly-curved arms connecting the center portion and the ring, substantially as described.

In testimony whereof I have hereunto set my hand this 9th day of August, A. D. 1895.

CHARLES L. TRAVIS.

In presence of—
M. E. GOOLEY,
C. G. HAWLEY.